(12) United States Patent
Michael et al.

(10) Patent No.: US 11,471,815 B2
(45) Date of Patent: Oct. 18, 2022

(54) AIR FILTER AND VENTILATION SYSTEM COMPRISING THE AIR FILTER

(71) Applicant: Mahle International GmbH, Stuttgart (DE)

(72) Inventors: Markus Michael, Ilsfeld (DE); Florian Muhrer, Waldmuenchen (DE); Walter Wolf, Oppenweiler-Zell (DE)

(73) Assignee: Mahle International GmbH

( * ) Notice: Subject to any disclaimer, the term of this patent is extended or adjusted under 35 U.S.C. 154(b) by 269 days.

(21) Appl. No.: 16/677,658

(22) Filed: Nov. 7, 2019

(65) Prior Publication Data
US 2020/0147539 A1 May 14, 2020

(51) Int. Cl.
| | |
|---|---|
| *B01D 46/52* | (2006.01) |
| *B01D 36/00* | (2006.01) |
| *B01D 46/44* | (2006.01) |
| *B60H 3/06* | (2006.01) |
| *B01D 46/00* | (2022.01) |

(52) U.S. Cl.
CPC ......... *B01D 46/522* (2013.01); *B01D 36/001* (2013.01); *B01D 46/0086* (2013.01); *B01D 46/446* (2013.01); *B60H 3/0608* (2013.01); *B01D 2273/18* (2013.01); *B01D 2279/35* (2013.01)

(58) Field of Classification Search
CPC .. B01D 46/0086; B01D 46/10; B01D 46/446; B01D 46/522; B01D 2279/35; B01D 2273/18; B01D 2201/12; B01D 36/001; B01D 2201/081; B01D 2201/082; B01D 2201/083; B01D 2201/084; B01D 46/521; B01D 46/523; B01D 46/525; B60H 3/06; B60H 3/0608; B60H 3/0616; B60H 2003/065
See application file for complete search history.

(56) References Cited

U.S. PATENT DOCUMENTS

| | | | | |
|---|---|---|---|---|
| 8,747,507 B2 * | 6/2014 | Haefner | ............... | F24F 8/10 55/497 |
| 9,126,131 B2 * | 9/2015 | Arold | ............... | B01D 46/0006 |

(Continued)

FOREIGN PATENT DOCUMENTS

| | | |
|---|---|---|
| DE | 10017361 A1 | 10/2001 |
| DE | 102009059782 A1 | 4/2011 |

(Continued)

OTHER PUBLICATIONS

English abstract for DE-102015000279.
English abstract for DE-102009059782.
English abstract for DE-10017361.

*Primary Examiner* — Gabriel E Gitman
(74) *Attorney, Agent, or Firm* — Fishman Stewart PLLC

(57) ABSTRACT

An air filter for a ventilation system of a motor vehicle may include a plate-shaped filter body of a folded filter material and at least one sealing strip secured to a lateral edge of the filter body. Adjacent folds of the filter body may be connected to one another via a seam, may follow one another in a longitudinal filter direction, and may extend in a transverse filter direction. The at least one sealing strip may have at least one removal opening penetrating the at least one sealing strip. At least one removal nozzle for removing air flowing through the air filter may be securable to the at least one removal opening.

20 Claims, 2 Drawing Sheets

(56) References Cited

U.S. PATENT DOCUMENTS

2010/0043366 A1* 2/2010 Boehrs .............. B01D 46/0005
  55/497
2016/0243923 A1* 8/2016 Denninger ......... B01D 46/0006

FOREIGN PATENT DOCUMENTS

| DE | 102012005188 A1 | 12/2012 |
| DE | 102013015630 A1 | 3/2015 |
| DE | 102015000279 A1 | 7/2015 |

* cited by examiner

AIR FILTER AND VENTILATION SYSTEM COMPRISING THE AIR FILTER

CROSS-REFERENCE TO RELATED APPLICATIONS

This application claims priority to German Patent Application No. DE 10 2018 219 062.3, filed on Nov. 8, 2018, the contents of which are hereby incorporated by reference in its entirety.

TECHNICAL FIELD

The invention relates to an air filter for a ventilation system of a motor vehicle. The invention also relates to a ventilation system comprising such an air filter.

BACKGROUND

Air filters are used to filter air in ventilation systems— such as, for example, in an air-conditioning system of a motor vehicle. They are folded from a filter material and are secured in a receiving space of the ventilation systems, through which air can flow. Folds of the air filter are thereby sealed at least on longitudinal lateral edges, and the air filter per se is sealed in the receiving space circumferentially thereto, so that the air flows only through the filter material through the receiving space from a so-called raw side to a so-called clean side of the air filter. Impurities are thereby caught in the filter material and the air is thus freed from them. Over time, however, the air filter loses its function, because less and less free filter material is available for filtering due to impurities, which deposit. The function of the air filter thus has to be monitored in the ventilation system. This can take place, for example, via the measurement of the pressure drop at the air filter. A tapping of very clean air, for example, may further be required for a fine dust sensor. Disadvantageously, these and further additional functions can currently not be realized or can only be realized in a complex manner on the air filter.

SUMMARY

It is thus the object of the invention to specify an improved or at least alternative design for an air filter and a ventilation system comprising the air filter of the generic type, in the case of which the described disadvantages are resolved.

According to the invention, this object is solved by means of the subject matter of the independent claim(s). Advantageous embodiments are subject matter of the dependent claim(s).

An air filter is provided for a ventilation system of a motor vehicle and has a plate-shaped filter body of a folded filter material and at least one sealing strip. The at least one sealing strip is thereby secured to a lateral edge of the filter body. Adjacent folds of the filter body, which are connected to one another by means of a seam, follow one another in a longitudinal filter direction in the air filter and extend in a transverse filter direction. According to the invention, at least one removal opening is configured on at least one sealing strip of the air filter, which penetrates said air filter and to which at least one removal nozzle for removing air, which flows through the air filter, can be secured.

In the present invention, the term "sealing strip" captures a lateral band as well as a front band. The lateral band is thereby secured to a longitudinal lateral edge of the filter body, which is parallel to the longitudinal filter direction. The lateral band is preferably adhered to the filter body. The front band is thereby secured to a longitudinal end of the filter body, which is parallel to the transverse filter direction—or arranged transversely to the longitudinal filter direction. The front band can be formed by a separate strip, which is secured—preferably adhered—to an end fold of the filter body, as well as by the end fold of the filter body. The filter body is designed in a plate-shaped manner and is a flat element of equal thickness comprising six surface areas, which are each aligned perpendicular to one another in pairs. The removal nozzle can be made of plastic, for example.

The at least one removal opening leads to the outside from an inner region of the filter body, so that air flowing through the air filter can be removed directly from the inner region of the air filter via the removal nozzle. The air filter can advantageously have a plurality of removal openings comprising shapes, which differ from one another, and/or cross sectional surfaces, which differ from one another. The plurality of removal openings in the air filter can additionally be designed differently from one another. It can advantageously be provided that the at least one removal opening has a round or oval or cross-shaped or polygonal cross section. Other shapes of the cross sections are generally also conceivable. Alternatively, the at least one removal opening can be a cut in the respective sealing strip. Alternatively, the at least one removal opening can be a lateral cut, which is open on one side, or a lateral notch, which is open on one side, in the respective sealing strip.

Regardless of the design of the at least one removal opening, the correspondingly adapted removal nozzle can be secured to said removal opening for removing air flowing through the air filter. The at least one removal opening can advantageously be configured on a clean side of the air filter for removing air for the reference measurement or for the test measurement or for the cooling of further elements of the motor vehicle. Alternatively or additionally, the at least one removal opening can be configured on a raw side of the air filter for removing air for cooling further elements of the motor vehicle. Regardless of the design of the removal opening, the removal nozzle, which can be secured thereto, is adapted accordingly.

It is provided in the case of a further development of the air filter that the at least one sealing strip is secured to a longitudinal lateral edge of the filter body, which is parallel to the longitudinal filter direction, and that the at least one removal opening is configured between two adjacent folds. A distance of these two adjacent folds and a distance between other adjacent folds of the filter body only differ slightly from one another—for example by less than 20%— or are identical. The removal opening can thereby be designed as described above, and the dimensions thereof can advantageously be adapted to the distance between the two adjacent folds. Due to the distance, which is identical or which only differs slightly, between the folds of the filter body—namely regardless of the shape of the removal opening in the sealing strip—the filter body remains stable. The filter body can in particular also remain sufficiently stiff in the case of a material of the filter body, which is soaked with water, which is entrained in air.

In the case of a further alternative or additional design, it can be provided that the at least one sealing strip is secured to a longitudinal lateral edge of the filter body, which is parallel to the longitudinal filter direction, and that the at least one removal opening is configured between two adjacent folds. A height of the two adjacent folds and a height of the other folds of the filter body thereby differ only slightly from one another or are identical. The stiffness of the filter body can be maintained by means of this advantageous design of the filter body. The removal opening can thereby be designed as described above, and the dimensions thereof can be appropriately adapted to the distance between the two adjacent folds.

It can alternatively be provided that the at least one sealing strip is secured to a longitudinal lateral edge of the filter body, which is parallel to the longitudinal filter direction, and that a short fold is arranged between two folds. The short fold preferably faces a raw side of the filter body, so that the filter body remains stable when being flown against. A height of the short fold is thereby smaller than a height of the two folds adjacent thereto, and can be 50%, for example. The at least one removal opening is then configured between the fold of the short fold and a strip edge of the sealing strip between the two folds adjacent to the short fold. The removal opening can thereby be designed as described above. The dimensions of the removal opening can be enlarged by means of the short fold, and the filter body can nonetheless remain sufficiently stiff.

It goes without saying that a plurality of removal openings of different designs, which are secured in the sealing strip on the longitudinal lateral edge of the filter body, which is parallel to the longitudinal filter direction, can be provided in the air filter. The filter body can thereby also be designed in a correspondingly different manner. Regardless of the design of the at least one removal opening, the correspondingly adapted removal nozzle for removing air flowing through the air filter can be secured to said removal opening.

It can advantageously be provided that the at least one removal nozzle is secured to the at least one removal opening. The removal nozzle thereby penetrates the at least one removal opening and is secured in a form-fitting manner to a wall of the sealing strip, which encloses the respective removal opening, by means of gripping elements, which protrude from the respective removal opening. The gripping elements can be configured integrally on the removal nozzle or in one piece therewith, respectively. The gripping elements can, for example, be arranged bilaterally on the wall around the removal opening, so that the removal nozzle is clamped in the removal opening. Alternatively, the at least one removal nozzle can be secured to the at least one removal opening and cannot penetrate the at least one removal opening. Said removal nozzle can then be secured by means of a substance-to-substance bond to the wall of the sealing strip, which encloses the respective removal opening. The removal nozzle can thus be adhered to the wall around the respective removal opening.

Advantageously, it can additionally be provided that the at least one removal nozzle has an I-shaped or T-shaped or cross-shaped or V-shaped or U-shaped or O-shaped or L-shaped or C-shaped or H-shaped fin. The fin thereby transitions into a hollow region of the at least one removal nozzle, so that the fin leads the hollow region and widens the at least one removal opening for the hollow region in response to securing the at least one removal nozzle to the at least one removal opening. The leading fin can in particular simplify the securing of the removal nozzle in the at least one removal opening in the form of a cut or of a lateral cut.

In the case of a further development of the air filter, it is provided that the at least one removal opening is arranged in the sealing strip asymmetrically to its longitudinal axis and/or to its transverse axis. A poka-yoke principle can be realized in the air filter in this advantageous manner and an incorrect mounting of the air filter can be prevented.

The invention also relates to a ventilation system for a motor vehicle comprising the above-described air filter and comprising a housing. The air filter is thereby secured in a receiving space of the housing so that air can flow through. The air filter thereby has the plate-shaped filter body of the folded filter material and the at least one sealing strip. The at least one sealing strip is thereby secured to the lateral edge of the filter body. Adjacent folds of the filter body, which are connected to one another by means of a seam, thereby follow one another in the air filter in a longitudinal filter direction and extend in a transverse filter direction. On at least one sealing strip of the air filter, the at least one removal opening is configured, which penetrates said air filter and to which at least one removal nozzle for removing air, which flows through the air filter, is secured. The at least one removal opening of the air filter is thereby coupled via the at least one removal nozzle to an air passage in the receiving space so as to guide air, so that air, which flows through the air filter, can be guided out of the air filter via the removal nozzle to the at least one air passage and further out of the receiving space.

The at least one removal opening can advantageously be configured on a clean side of the air filter for removing air for the reference measurement or for the test measurement or for the cooling of further elements of the motor vehicle. Alternatively or additionally, the at least one removal opening can be configured on a raw side of the air filter for removing air for cooling further elements of the motor vehicle. Regardless of the design of the removal opening, the removal nozzle secured to said removal opening is adapted accordingly.

In the case of a further development of the ventilation system, it is provided that the at least one removal nozzle is configured or secured in the receiving space of the ventilation system and is firmly coupled to the at least one air passage so as to guide air. By inserting the air filter into the receiving space, the at least one removal nozzle is thereby secured to the at least one removal opening. The at least one removal nozzle can alternatively be secured to the at least one removal opening, and a coupling nozzle can be configured in the receiving space of the ventilation system. The coupling nozzle can thereby be firmly coupled to the at least one air passage so as to guide air, and the removal nozzle can be coupled to the coupling nozzle so as to guide air by means of the insertion of the air filter into the receiving space.

At least one further air passage in the receiving space can advantageously be closed in an air-tight manner by means of one of the sealing strips by means of the insertion of the air filter into the receiving space. A plurality of air passages, which, depending on the design of the air filter, are either coupled thereto so as to guide air or are closed, can thus be present in the receiving space. It can thus be decided by means of the configuration of the air filter, where and if the air is even removed in the air filter. The ventilation system can alternatively have a closing unit, which closes at least one further air passage in the receiving space.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
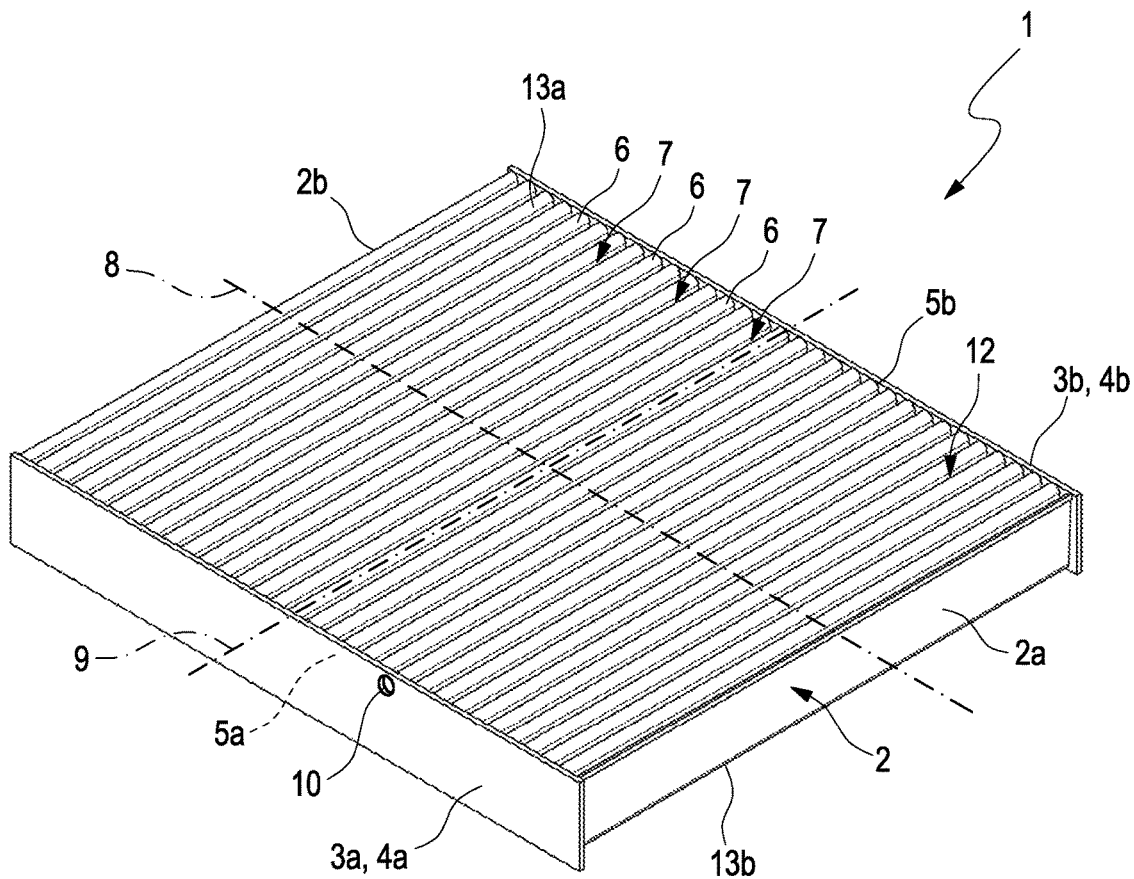
FIG. 1 shows a view of an air filter according to the invention.

FIG. 1 shows a view of an air filter 1 according to the invention for a ventilation system of a motor vehicle. The air filter 1 has a plate-shaped filter body 2 of a folded filter material and two sealing strips 3a and 3b. In this exemplary embodiment, the sealing strips 3a and 3b are lateral bands 4a and 4b, which are each secured to a longitudinal lateral edge 5a and 5b of the filter body 2—for example adhered thereto. Adjacent folds 7 of the filter body 2, which are connected to one another by means of a seam 6, follow one another in the air filter 1 in a longitudinal filter direction 8 and extend in a transverse filter direction 9. The sealing strips 3a and 3b laterally seal the air filter 1, so that the air can flow through the air filter 1 only via the filter material of the air filter 1. The respective longitudinal lateral edge 5a and 5b of the filter body 2 thereby extend parallel to the longitudinal filter direction 8 and laterally close the filter body 2 transversely to transverse filter direction 9. On the longitudinal ends 2a and 2b of the filter body 2, the latter is sealed by means of the respective last folds 7.

On the respective sealing strip 3a and 3b of the air filter 1—here only visible on the sealing strip 3a—a removal opening 10 penetrating it is configured. A removal nozzle 11—see FIG. 5 with regard to this—for removing air, which flows through the air filter 1, is secured to the removal opening 10. The removal opening 10 leads to the outside from an inner region 12 of the filter body 2, so that air flowing through the air filter 1 can be removed directly from the inner region 12 of the air filter 1 via the removal nozzle 11—as shown in FIG. 5. Further details will be described below on the basis of FIG. 2 to FIG. 5.

Figure 2:
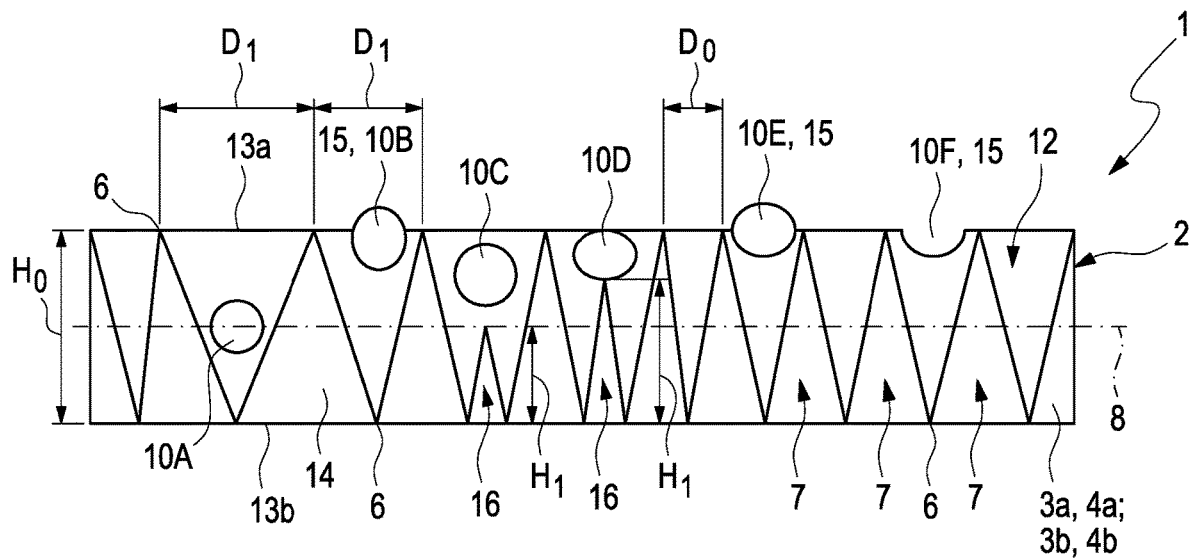
FIGS. 2 to 4 show side views onto a sealing strip in the air filter comprising removal openings, which are designed differently.

FIG. 2 shows a side view onto the sealing strip 3a or 3b in the air filter 1. By way of comparison, a plurality of removal openings 10—additionally identified with A to E—which are designed differently, are shown here on a clean side 13a of the air filter 1. The removal openings 10 shown here by way of comparison can be provided, for example, for removing air for the reference measurement or for the test measurement or for the cooling of further elements of the motor vehicle. It goes without saying that an individual removal opening 10 as well as a plurality of removal openings 10, which are designed identically to one another or differently from one another, can be configured on the sealing strip 3a or 3b. Regardless of the design of the respective removal opening 10, the correspondingly adapted removal nozzle 11—see FIG. 5 with regard to this—for removing air flowing through the air filter 1 can be secured to said removal opening.

The removal openings 10A, 10C, and 10D are enclosed completely by a wall 14 of the sealing strip 3a or 3b. The removal openings 10A, 10C, and 10D each have an almost circular cross section. The removal openings 10B, 10E, and 10F art formed in the sealing strip 3a or 3b in the form of lateral notches 15, which are open on one side. The removal openings 10A, 10B, 10E, and 10F are each configured between two adjacent folds 7. The two adjacent folds 7 and the other folds 7 of the filter body 2 thereby have an identical height Ho. A distance Di of the two folds 7 as compared to the distance Do of the other folds 7 from one another is slightly enlarged in the case of the removal openings 10A and 10B. The removal openings 10C and 10D are each arranged on a short fold 16 between two adjacent folds 7. A height Hi of the short fold 16 is thereby smaller than a height Ho of the two folds 7 adjacent thereto. In the case of the removal opening 10C, the height Hi of the short fold 16 is approximately 50%, and in the case of the removal opening 10D approximately 75% of the height Ho of the adjacent folds 7. The short folds 16 are arranged so as to face a raw side 13b of the filter body 2, so that the filter body 2 remains stable in response to being flown against.

Figure 3:
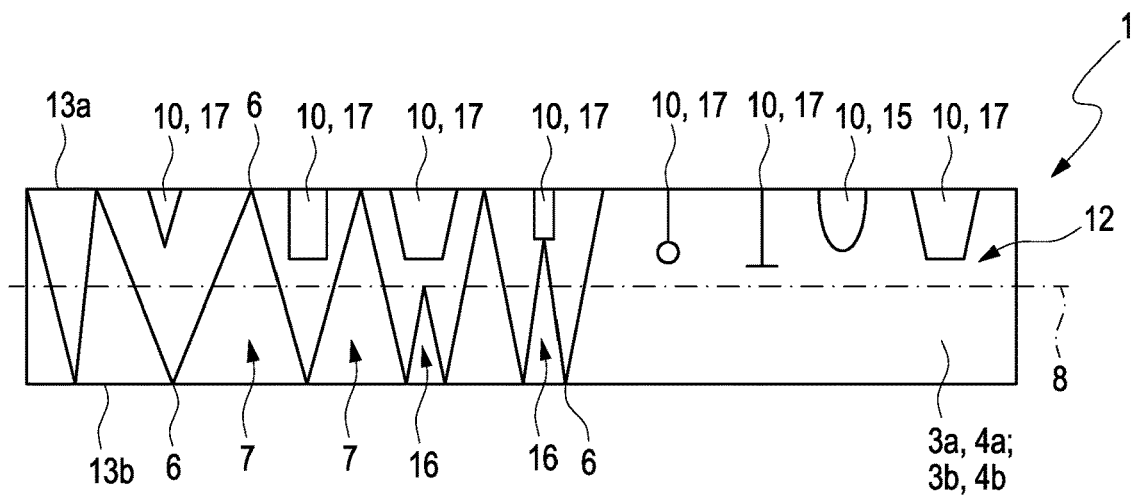

FIG. 3 shows a side view onto the sealing strip 3a or 3b in the air filter 1. By way of comparison, a plurality of removal openings 10, which are designed differently, are shown here on the clean side 13a of the air filter 1. Here, the removal openings 10 are lateral cuts 17, which are open on one side, or the lateral notches 15 in the sealing strip 3a or 3b, which are open on one side. As shown, the removal openings 10 can be designed differently from one another.

Figure 4:
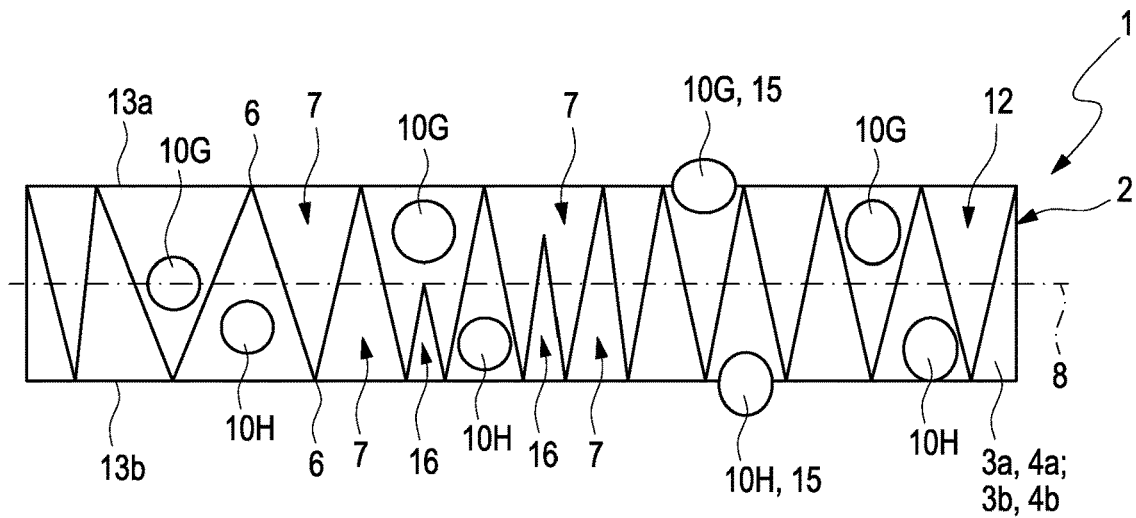
Figure 5:
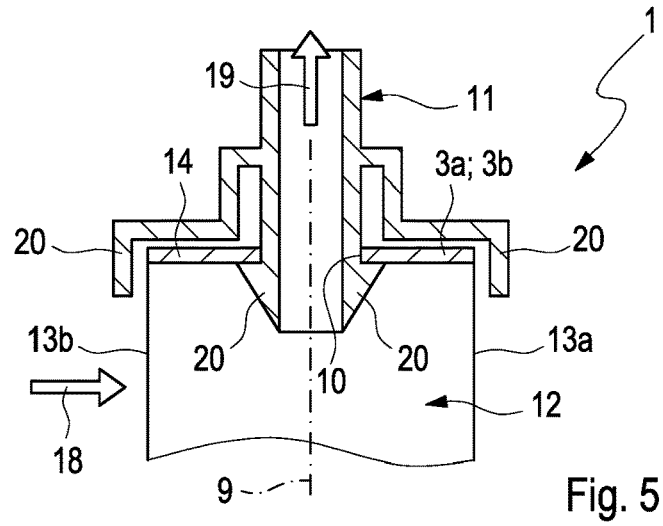
FIG. 5 shows a sectional view of the air filter comprising a removal opening and removal nozzles secured therein.

FIG. 4 shows a side view onto the sealing strip 3a or 3b in the air filter 1. By way of comparison, a plurality of pairs of the removal openings 10, which are designed differently, are shown here. The one removal opening 10G is thereby configured on the clean side 13a, and the other removal opening 10H on the raw side 13b. The removal openings 10G and 10H can be used, for example, for the differential pressure measurement for monitoring the function of the air filter 1. As also shown in FIG. 2, the removal openings 10G and 10H can be configured between the adjacent folds 7 as well as on the short fold 16.

With reference to FIG. 2 to FIG. 4, none of the removal openings 10 is arranged in the sealing strip 3a or 3b symmetrically to its longitudinal axis and/or to its transverse axis. An incorrect mounting of the air filter 1 can be prevented advantageously thereby.

FIG. 5 shows a sectional view of the air filter 1 comprising the removal opening 10 and comprising the removal nozzle 11. The air filter 1 is thereby flown through in an air flow direction 18, and the air is removed from the inner region 12 of the air filter 1 in a removal direction 19, as suggested by means of arrows. The air flow direction 18 further defines the clean side 13a and the raw side 13b of the air filter 1. The removal nozzle 11 is secured in the removal opening 10 and penetrates it. Gripping elements 20, which secure the removal nozzle to the wall 14 around the removal opening 10 in a form-fitting manner, are integrally configured on the removal nozzle 11. The gripping elements 20 further also encompass the respective sealing strip 3a or 3b, so that the removal nozzle 11 is reliably secured to the filter body 2.

The removal nozzle 11 can generally also be designed without gripping elements 20. The removal nozzle 11 can further be integrated into a housing wall of the ventilation system. The housing wall thereby limits a receiving space inside a housing of the ventilation system. The removal nozzle 11 can thereby penetrate the respective sealing strip 3a or 3b of the air filter 1, when the latter is inserted into the receiving space. The removal nozzle 11 can in particular penetrate the air filter 1 according to a poka-yoke principle, so that an incorrect mounting of the air filter 1 in the receiving space is prevented. The removal opening 10 and the removal nozzle 11 provided for said removal opening can have shapes, which differ from one another. The respective removal nozzle 11 can have a fin—or a plurality of fins—which lies inside the respective removal opening 10 and which is enclosed by the wall 14 of the sealing strip 3*a* or 3*b* and is limited to the outside. The fin can thereby be O-shaped, L-shaped, U-shaped, C-shaped, V-shaped, H-shaped, I-shaped or T-shaped or can have a different suitable shape. For the reliable mounting, the fin can additionally be provided with bevels on a longitudinal end facing the respective removal opening 10. On an opposite longitudinal end, the fin can transition into a hollow region of the removal nozzle 11 and can end in or on the respective hollow region of the removal nozzle 11. If the removal nozzle is integrated into the housing wall of the ventilation system, the respective fin can thus end at the housing wall. It is also conceivable that the fin forms the hollow space. The removal nozzle 11 can thereby be latched to the housing wall or can be clipped into it and can thus be coupled to an air passage in the receiving space so as to guide air.

The invention claimed is:

1. An air filter for a ventilation system of a motor vehicle, comprising:
   a plate-shaped filter body of a folded filter material including a plurality of folds; and
   at least one sealing strip secured to a lateral edge of the filter body;
   wherein adjacent folds of the filter body are connected to one another via a seam, follow one another in a longitudinal filter direction, and extend in a transverse filter direction; and
   wherein the at least one sealing strip has at least one removal opening penetrating the at least one sealing strip and to which at least one removal nozzle for removing air flowing through the air filter is securable.

2. The air filter according to claim 1, wherein at least one of:
   the at least one removal opening has at least one of a round cross section, an oval cross section, a cross-shaped cross section, and a polygonal cross section;
   the at least one removal opening is structured as a cut in the at least one sealing strip; and
   the at least one removal opening is configured as at least one of (i) a lateral cut which is open on one side and (ii) a lateral notch which is open on one side, in the at least one sealing strip.

3. The air filter according to claim 1, wherein the at least one sealing strip is secured to a longitudinal lateral edge of the filter body extending parallel to the longitudinal filter direction, and wherein at least one of:
   the at least one removal opening is disposed between two adjacent folds of the filter body, and a distance between the two adjacent folds and a distance between other adjacent folds of the filter body are one of (i) slightly different from one another and (ii) identical to one another;
   the at least one removal opening is disposed between two adjacent folds of the filter body, and a height of the two adjacent folds and a height of the other folds of the filter body are one of (i) slightly different from one another and (ii) identical to one another; and
   a short fold is arranged between two folds of the filter body, a height of the short fold is smaller than a height of the two folds adjacent thereto, and the at least one removal opening is secured between a seam of the short fold and a strip edge of the at least one sealing strip between the two folds adjacent to the short fold.

4. The air filter according to claim 1, wherein at least one of:
   the at least one removal opening is configured on a clean side of the air filter for removing air for at least one of (i) a reference measurement, (ii) a test measurement, and (iii) cooling of further elements of the motor vehicle; and
   the at least one removal opening is configured on a raw side of the air filter for removing air for cooling further elements of the motor vehicle.

5. The air filter according to claim 1, wherein the at least one removal nozzle is secured to the at least one removal opening, and wherein at least one of:
   the at least one removal nozzle penetrates the at least one removal opening and is secured in a form-fitting manner to a wall of the at least one sealing strip enclosing the at least one removal opening via a plurality of gripping elements protruding from the at least one removal opening; and
   the at least one removal nozzle does not penetrate the at least one removal opening and is secured via a substance-to-substance bond to a wall of the at least one sealing strip enclosing the at least one removal opening.

6. The air filter according to claim 5, wherein the at least one removal nozzle includes a fin having one of an I-shape, a T-shape, a cross-shape, a V-shape, a U-shape, an O-shape, an L-shape, a C-shape, and an H-shape, the fin transitioning into a hollow region of the at least one removal nozzle such that the fin leads the hollow region and widens the at least one removal opening for the hollow region when securing the at least one removal nozzle to the at least one removal opening.

7. The air filter according to claim 1, wherein the at least one removal opening is arranged in the at least one sealing strip asymmetrically to at least one of a longitudinal axis of the at least one sealing strip and a transverse axis of the at least one sealing strip.

8. The air filter according to claim 1, wherein the at least one removal opening includes a plurality of removal openings having at least one of (i) shapes which differ from one another, and (ii) cross sectional surfaces which differ from one another.

9. The air filter according to claim 1, wherein:
   the at least one sealing strip is secured to a longitudinal lateral edge of the filter body extending parallel to the longitudinal filter direction;
   the at least one removal opening is disposed between two adjacent folds of the plurality of folds; and
   a distance between the two adjacent folds and a distance between other adjacent folds of the filter body are substantially identical to one another.

10. The air filter according to claim 1, wherein:
    the at least one sealing strip is secured to a longitudinal lateral edge of the filter body extending parallel to the longitudinal filter direction;
    the at least one removal opening is disposed between two adjacent folds of the plurality of folds; and
    a height of the two adjacent folds and a height of other folds of the plurality of folds are substantially identical to one another.

11. The air filter according to claim 1, wherein:
    the at least one removal nozzle is secured to the at least one removal opening; and the at least one removal nozzle penetrates the at least one removal opening and is secured in a form-fitting manner to a wall of the at least one sealing strip enclosing the at least one removal opening via a plurality of gripping elements protruding from the at least one removal opening.

12. The air filter according to claim 1, wherein:
the at least one removal nozzle is secured to the at least one removal opening; and
the at least one removal nozzle does not penetrate the at least one removal opening and is secured via a substance-to-substance bond to a wall of the at least one sealing strip enclosing the at least one removal opening.

13. A ventilation system for a motor vehicle, comprising an air filter and a housing, the air filter including:
a plate-shaped filter body of a folded filter material; and
at least one sealing strip secured to a lateral edge of the filter body;
wherein adjacent folds of the filter body are connected to one another via a seam, follow one another in a longitudinal filter direction, and extend in a transverse filter direction;
wherein the at least one sealing strip has at least one removal opening penetrating the at least one sealing strip and to which at least one removal nozzle for removing air flowing through the air filter is securable;
wherein the air filter is secured in a receiving space of the housing such that air is flowable through the air filter; and
wherein the at least one removal opening is coupled via the at least one removal nozzle to at least one air passage in the receiving space such that air is guidable out of the air filter via the at least one removal nozzle to the at least one air passage and out of the receiving space.

14. The ventilation system according to claim 13, wherein at least one of:
the at least one removal nozzle is arranged in the receiving space and is coupled to the at least one air passage to guide air, and the at least one removal nozzle is secured to the at least one removal opening via insertion of the air filter into the receiving space; and
the at least one removal nozzle is secured to the at least one removal opening, a coupling nozzle is disposed in the receiving space and coupled to the at least one air passage to guide air, and the at least one removal nozzle is coupled to the coupling nozzle via insertion of the air filter into the receiving space.

15. The ventilation system according to claim 13, wherein the receiving space includes at least one further air passage, and wherein at least one of:
the at least one further air passage is closed in an air-tight manner by the at least one sealing strip via insertion of the air filter into the receiving space; and
a closing unit closes the at least one further air passage.

16. An air filter for a ventilation system of a motor vehicle, comprising:
a plate-shaped filter body of a folded filter material including a plurality of folds; and
at least one sealing strip secured to a longitudinal lateral edge of the filter body extending in a longitudinal filter direction;
wherein adjacent folds of the plurality of folds are connected to one another via a seam, follow one another in the longitudinal filter direction, and extend in a transverse filter direction; and
wherein the at least one sealing strip has at least one removal opening penetrating the at least one sealing strip and to which at least one removal nozzle for removing air flowing through the air filter is securable.

17. The air filter according to claim 16, wherein:
the at least one removal opening is disposed between two adjacent folds of the plurality of folds; and
a distance between the two adjacent folds and a distance between other adjacent folds of the filter body differ slightly from one another.

18. The air filter according to claim 16, wherein:
the at least one removal opening is disposed between two adjacent folds of the plurality of folds; and
a height of the two adjacent folds and a height of other folds of the plurality of folds differ slightly from one another.

19. The air filter according to claim 16, wherein:
a short fold is arranged between two folds of the plurality of folds;
a height of the short fold is smaller than a height of the two folds adjacent thereto; and
the at least one removal opening is secured between a seam of the short fold and a strip edge of the at least one sealing strip between the two folds adjacent to the short fold.

20. The air filter according to claim 19, wherein the short fold faces a raw side of the filter body.

* * * * *